US011841898B2

(12) United States Patent
Reddig (10) Patent No.: US 11,841,898 B2
(45) Date of Patent: Dec. 12, 2023

(54) COHERENT PICTOGRAPH ORGANIZER BASED ON STRUCTURING PATTERN MARKERS FOR HIERARCHAL PICTOGRAPH PRESENTATION

(71) Applicant: WhiteStar Communications, Inc., Durham, NC (US)

(72) Inventor: Fabian Reddig, Mebane, NC (US)

(73) Assignee: WhiteStar Communications, Inc., Durham, NC (US)

( * ) Notice: Subject to any disclaimer, the term of this patent is extended or adjusted under 35 U.S.C. 154(b) by 113 days.

(21) Appl. No.: 17/539,778

(22) Filed: Dec. 1, 2021

(65) Prior Publication Data

US 2023/0169108 A1 Jun. 1, 2023

(51) Int. Cl.
*G06F 16/538* (2019.01)

(52) U.S. Cl.
CPC ................... *G06F 16/538* (2019.01)

(58) Field of Classification Search
CPC ..................................................... G06F 16/538
See application file for complete search history.

(56) References Cited

U.S. PATENT DOCUMENTS

| | | | | |
|---|---|---|---|---|
| 6,990,452 B1* | 1/2006 | Ostermann | .......... | G06Q 10/107 345/473 |
| 8,255,810 B2* | 8/2012 | Moore | .................. | G06F 3/0482 715/752 |
| 10,203,843 B2* | 2/2019 | Tobens, III | ......... | G06F 3/04845 |
| 2010/0125811 A1* | 5/2010 | Moore | ................ | G06F 3/04817 715/846 |
| 2017/0185581 A1* | 6/2017 | Bojja | ............... | G06V 30/19173 |
| 2018/0107651 A1* | 4/2018 | Hamilton | .............. | G06F 3/0482 |
| 2018/0260385 A1* | 9/2018 | Fan | ........................ | G06F 40/274 |
| 2021/0216203 A1* | 7/2021 | Wu | ....................... | G06F 3/0482 |

OTHER PUBLICATIONS

"Class BreakIterator", Java Platform SE7, [online], [retrieved on Nov. 24, 2021]. Retrieved from the Internet: URL: <https://docs.oracle.com/javase/7/docs/api/java/text/BreakIterator.html>, pp. 1-10.

(Continued)

*Primary Examiner* — Angelica Ruiz
(74) *Attorney, Agent, or Firm* — Leon R. Turkevich (57) ABSTRACT

A computing device obtains prescribed sequences of code points for respective pictographs (e.g., "emojis") from a prescribed destination, determines identifiable graphical subcomponents from the prescribed sequence of code points for each pictograph, and maps the identifiable graphical subcomponents into distinct pattern marker types used for generation of a selected pictograph. The mapping includes aggregating selected graphical subcomponents from among the pictographs as distinct options for an identified one of the pattern marker types. The computing device causes display of the pictographs as a grouping together of respective variations relative to a root pictograph that is based on the identified one of the pattern marker types, where the grouping is based on arranging the distinct options for the pattern marker types relative to the root pictograph, enabling a user selection of the selected pictograph within the grouping relative to the root pictograph.

21 Claims, 9 Drawing Sheets

(56) References Cited

OTHER PUBLICATIONS

"Emojipedia—Home of Emoji Meanings", [online], [retrieved on Nov. 9, 2021]. Retrieved from the Internet: URL <https://emojipedia.org/>, pp. 1-4.

"Gradle Build Tool", [online], [retrieved on Nov. 22, 2021]. Retrieved from the Internet: URL: <https://gradle.org/> pp. 1-7.

Unicode.org, "Emoji Keyboard/Display Test Data for UTS #51, Version: 13.0", [online], Jan. 21, 2020, [retrieved on Nov. 9, 2021]. Retrieved from the Internet: URL: <https://unicode.org/Public/emoji/13.0/emoji-test.txt>, pp. 1-108.

Moon et al., U.S. Appl. No. 17/496,164, filed Oct. 7, 2021.

Society video, "Society Secure Messenger: The world's most secure way to chat", Text and Screenshots, (Mar. 10, 2020), [online], [Retrieved on Mar. 3, 2022]. Retrieved from the Internet: URL: <https://www.youtube.com/watch?v=jSRmnseSCVA>, 9 pages.

Society video, "Complete AI Security", Text, Transcript, and Screenshots, (Mar. 19, 2020), [online], [Retrieved on Mar. 3, 2022]. Retrieved from the Internet: URL: <https://www.youtube.com/watch?v=5U2khXXcDMo>, 16 pages.

Society video, "Society's Best in Class Security and the Cohort System", Text, Transcript, and Screenshots, (Mar. 26, 2020), [online], [Retrieved on Mar. 3, 2022]. Retrieved from the Internet: URL: < https://www.youtube.com/watch?v=dwUlktWMMoc>, 11 pages.

Society video, "Society Tutorial 6 : Advanced Controls", Transcript and Screenshots, (Apr. 6, 2020), [online], [Retrieved on Mar. 3, 2022]. Retrieved from the Internet: URL: <https://www.youtube.com/watch?v=5jIVTcQmADw>, 5 pages.

Society video, "Society Tutorial 5: Conversation Controls", Transcript and Screenshots, (Apr. 6, 2020), [online], [Retrieved on Mar. 4, 2022]. Retrieved from the Internet: URL: <https://www.youtube.com/watch?v=v6uDbsFPqhc>, 11 pages.

Society video, "Creating a Conversation", Transcript and Screenshots, (Apr. 6, 2020), [online], [Retrieved on Mar. 4, 2022]. Retrieved from the Internet: URL: <https://www.youtube.com/watch?v=irvX9ZyaPLM>, 4 pages.

Society video, "Society Tutorial Part 7 : Notifications and Misc", Transcript and Screenshots, (Apr. 6, 2020), [online], [Retrieved on Mar. 4, 2022]. Retrieved from the Internet: URL: <https://www.youtube.com/watch?v=muxTsR1PvZA>, 7 pages.

Society video, "Society Tutorial 1: Setting Up and Making a Connection", Transcript and Screenshots, (Jun. 29, 2020), [online], [Retrieved on Mar. 4, 2022]. Retrieved from the Internet: URL: <https://www.youtube.com/watch?v=4k8cYbv-Of0>, 15 pages.

* cited by examiner

AGGREGATE SUBCOMPONENTS INTO
DISTINCT OPTIONS FOR IDENTIFIED
PATTERN MARKER TYPES,
56

| "G" GENDER | | 32a | "S" SKIN TONE | | 32b | "Z" ZERO WIDTH JOIN | 32c | "E" EMOJI CATEGORY | 32d |
|---|---|---|---|---|---|---|---|---|---|
| G1 | PERSON | 1F9D1 | S1 | LIGHT | 1F3FB | 200D | | FIRE ENGINE | 1F692 |
| G2 | MAN | 1F468 | S2 | MEDIUM-LIGHT | 1F3FC | | | | |
| G3 | WOMAN | 1F469 | S3 | MEDIUM | 1F3FD | | | | |
| | | | S4 | MEDIUM-DARK | 1F3FE | | | | |
| | | | S5 | DARK | 1F3FF | | | | |
| | | | S6 | (NONE) | [BLANK] | | | | |

COHERENT PICTOGRAPH ORGANIZER BASED ON STRUCTURING PATTERN MARKERS FOR HIERARCHAL PICTOGRAPH PRESENTATION

TECHNICAL FIELD

The present disclosure generally relates to a coherent pictograph organizer based on structuring pattern markers for a hierarchal presentation autonomic distribution of hyperlinked hypercontent in a secure peer-to-peer data network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Pictographs or "emojis" have enabled users of user-controlled devices (e.g., smart phones, smart tablets, personal computer devices, etc.) to communicate using various images that can be inserted ("inlined") into text-based messages using hexadecimal string values that are established and maintained by The Unicode Consortium.

Figure 1:
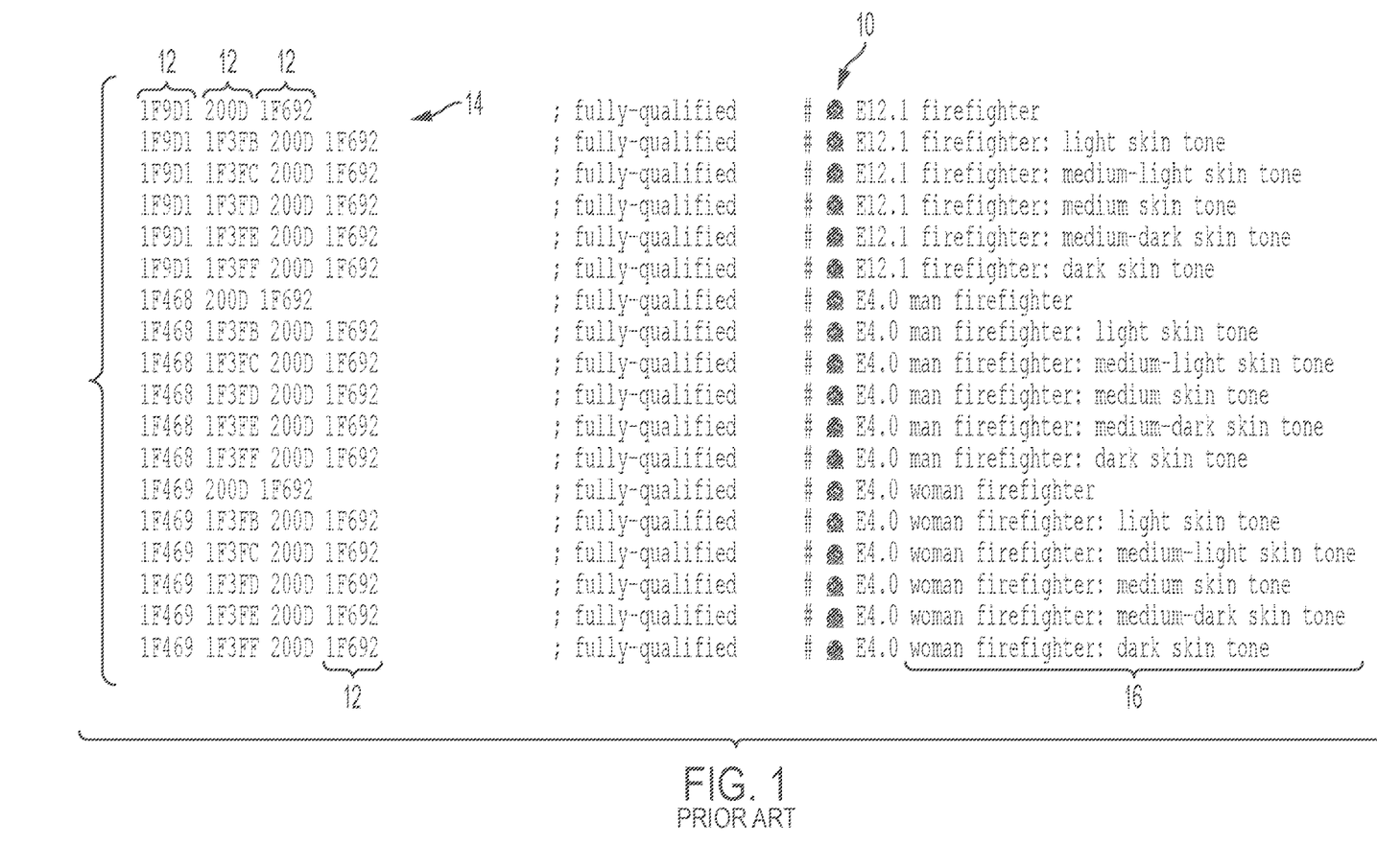
FIG. 1 illustrates a (PRIOR ART) listing of pictographs defined by hexadecimal character strings comprising sequences of code points, respectively.

FIG. 1 illustrates example pictographs 10 that are defined by The Unicode Consortium using respective prescribed sequences of "code points" 12 within hexadecimal string values 14, where each "code point" 12 represents a graphical component, and the combination of code points 12 within a hexadecimal string value 14 causes an aggregate modification of the graphical components resulting in the rendering and display of a unique pictograph (i.e., "emoji") 10 having a corresponding unique pictograph name or definition 16. As illustrated in FIG. 1 (obtained from The Unicode Consortium website at the Internet Address "unicode.org/Public/emoji/13.0/emoji-test.txt"), a non-gendered "firefighter" emoji definition 16 is defined by the prescribed sequence of code points "1F9D1 200D 1F692", where the code point "200D" 12 is a "zero-width join" separator between the code point "1F9D1" 12 (for a "person" definition 16) and the code point "1F692" 12 (for a "fire engine" definition 16).

Hence, The Unicode Consortium defines the non-gendered "firefighter" emoji definition 16 by combining in the hexadecimal sequence "1F9D1 200D 1F692" 14 the code point "1F9D1" 12 for the "person" definition 16 with the code point "1F692" 12 for the "fire engine" definition 16 using the zero-width join code point "200D" 12. Similarly, a code point "1F3FE" 12 (for a "medium-dark skin tone" definition) can be added into the hexadecimal sequence "1F9D1 1F3F3 200D 1F692" 14 to modify the non-gendered "firefighter" 16 into a non-gendered "firefighter: medium-dark skin tone" 16.

In contrast, The Unicode Consortium defines the gendered "man firefighter" definition 16 by the hexadecimal sequence "1F468 200D 1F692" 14 comprising the prescribed sequence of the code point "1F468" 12 (for a "man" definition 16), the code point "200D" 12 (for the zero-width join separator), and the code point "1F692" (for the "fire engine" definition 16). The Unicode Consortium defines the gendered "woman firefighter" 16 by the hexadecimal sequence "1F469 200D 1F692" 14 comprising the prescribed sequence of the code point "1F469" 12 (for a "woman" definition 16), the code point "200D" 12 (for the zero-width join separator), and the code point "1F692" (for the "fire engine" definition 16). As apparent from FIG. 1, The Unicode Consortium enables modification of the "man firefighter" definition 16 or the "woman firefighter" 16 by skin tone as described above, for example based on inserting the code point "1F3FE" 12 (for a "medium-dark skin tone" definition), resulting in the hexadecimal sequence "1F468 1F3FE 200D 1F692" 14 that defines a "man firefighter: medium-dark skin tone" 16, and the hexadecimal sequence "1F469 1F3FE 200D 1F692" 14 that defines a "woman firefighter: medium-dark skin tone" 16.

A fundamental problem with the existing code points is that new pictographs with respective definitions are regularly submitted to The Unicode Consortium for approval and adoption, with no consistency and no coherence or hierarchy in defining the pictographs: as illustrated in FIG. 1, different pictographs 10 are defined using different code points in different sequences, where a gender-defined "firefighter" is generated based on modifying one of a non-gendered "person", a gendered "man", or a gendered "woman" with a "fire engine" definition; in contrast, the above-identified Internet Address of The Unicode Consortium indicates that a generic "superhero" emoji ("1F9B8") can be modified into a "man superhero" emoji with the hexadecimal sequence "1F9B8 200D 2642 FEOF" 14, or modified into a "woman superhero" emoji with the hexadecimal sequence "1F9B8 200D 2640 FEOF" 14, both starting with the same generic "superhero" emoji ("1F9B 8").

Hence, a fundamental problem exists that the arbitrary addition of emoji definitions lacks any coherent organizational structure or hierarchy in modifying base emojis (or "root emojis") into modified emojis, resulting in an almost-random set of definitions for different emojis; hence, keyboard device programmers have needed to manually code new emoji definitions as they are published by The Unicode Consortium, since there has been no system for organizing the emojis for a structured presentation to a user of a keyboard device. The lack of any system for organizing emojis also has resulted in a disorganized presentation and display of existing emojis to a user display, requiring a user to scan through all the emoji variants in an attempt to locate and select a desired emoji.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises: obtaining, by a physical computing device from a prescribed destination via a wide area data network, prescribed sequences of code points for respective pictographs; determining, by the physical computing device, identifiable graphical subcomponents from the prescribed sequence of code points for each pictograph; mapping, by the physical computing device, the identifiable graphical subcomponents into distinct pattern marker types used for generation of a selected pictograph, including aggregating selected graphical subcomponents from among the pictographs as distinct options for an identified one of the pattern marker types; and causing, by the physical computing device, display of the pictographs as a grouping together of respective variations relative to a root pictograph that is based on the identified one of the pattern marker types, the grouping based on arranging the distinct options for the pattern marker types relative to the root pictograph, enabling a user selection of the selected pictograph within the grouping relative to the root pictograph.

In another embodiment, one or more non-transitory tangible media are encoded with logic for execution by a machine and when executed by the machine operable for: obtaining, by the machine implemented as a physical computing device from a prescribed destination via a wide area data network, prescribed sequences of code points for respective pictographs; determining identifiable graphical subcomponents from the prescribed sequence of code points for each pictograph; mapping the identifiable graphical subcomponents into distinct pattern marker types used for generation of a selected pictograph, including aggregating selected graphical subcomponents from among the pictographs as distinct options for an identified one of the pattern marker types; and causing display of the pictographs as a grouping together of respective variations relative to a root pictograph that is based on the identified one of the pattern marker types, the grouping based on arranging the distinct options for the pattern marker types relative to the root pictograph, enabling a user selection of the selected pictograph within the grouping relative to the root pictograph.

In another embodiment, an apparatus is implemented as a physical machine. The apparatus comprises non-transitory machine readable media configured for storing executable machine readable code; a device interface circuit configured for accessing a prescribed destination via a wide area network; and a processor circuit. The processor circuit is configured for executing the machine readable code as a secure executable container, and when executing the machine readable code operable for: obtaining a plurality of pictographs from the prescribed destination, each pictograph defined by a prescribed sequence of code points; determining identifiable graphical subcomponents from the prescribed sequence of code points for each pictograph; mapping the identifiable graphical subcomponents into distinct pattern marker types used for generation of a selected pictograph, including aggregating selected graphical subcomponents from among the pictographs as distinct options for an identified one of the pattern marker types, and causing display of the pictographs as a grouping together of respective variations relative to a root pictograph that is based on the identified one of the pattern marker types, the grouping based on arranging the distinct options for the pattern marker types relative to the root pictograph, enabling a user selection of the selected pictograph within the grouping relative to the root pictograph.

DETAILED DESCRIPTION

Particular embodiments enable a coherent organization of known pictographs into a group of pictographs that are grouped together as respective variations relative to a root pictograph. The pictographs can be grouped together based on determining identifiable graphical subcomponents from code points used to define a pictograph, and mapping the identifiable graphical subcomponents into distinct pattern marker types. The pattern marker types, used for generation of a selected pictograph, operate as metadata that describe the associated graphical subcomponents. Hence, a metadata-based "vocabulary" structure for the pictographs can be established based on aggregating selected graphical subcomponents from among the pictographs as distinct options for an identified pattern marker type.

The establishment of the pattern marker types as a metadata-based "vocabulary" structure enables the generation of the pictographs into identified groupings relative to an identified "root" pictograph that can be selected as a generic representation of the identified grouping of pictographs, even if all the pictographs do not share a common generic code point. Hence, the example embodiments can cause display of the pictographs as a grouping of respective variations relative to a root pictograph, based on arranging the options for the pattern marker types relative to the root pictograph.

Hence, the example embodiments eliminate the necessity of keyboard device programmers (e.g., smart tablet/smart phone programmers) to manually program individual pictographs for each and every of the thousands of pictographs that are published by The Unicode Consortium, for execution in their user devices. To the contrary, the example embodiments enable automated retrieval of pictographs defined by code points, automated structured mapping of graphical subcomponents (identified from the code points) into a metadata-based vocabulary of pattern marker types, and automated grouping of the pictographs based on identifying selected graphical subcomponents as optional variations relative to a pattern marker type. Hence, implementation of pictographs by keyboard device programmers can be reduced to generating the device-specific images for the pictographs based on the pattern marker types.

The example embodiments also enable a user of a user device to enjoy a compressed and organized hierarchical presentation of pictographs on the user device, for example during keyboard entry in a user-generated message (e.g., a text message), where a group of pictographs can be displayed as a matrix of respective variations of a selected root pictograph (among a plurality of available top-level root pictographs), enabling the user to select one of the variations within the matrix associated with the selected root pictograph.

Figure 2:
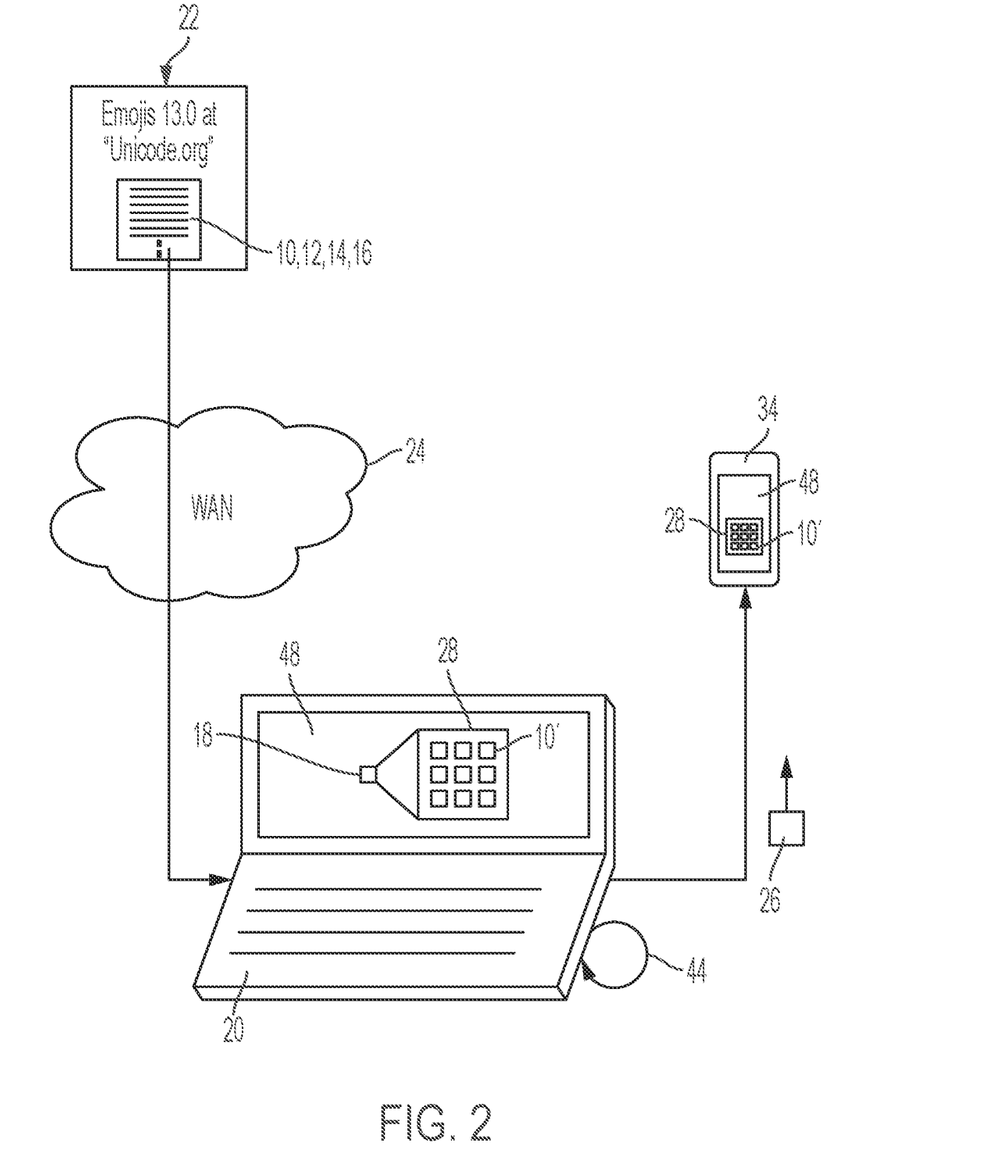
FIG. 2 illustrates an apparatus for retrieving pictographs from a prescribed destination and causing display of the pictographs as a grouping together of respective variations relative to a root pictograph, enabling a user selection of a selected pictograph within the grouping relative to the root pictograph, according to an example embodiment.

FIG. 2 illustrates an example physical computing device 20 configured for retrieving hexadecimal strings 14 and pictographic definitions 16 for respective pictographs 10 from a prescribed destination device 22 via a physical wide area data network (WAN) (e.g., the Internet) 24, and generating an executable container 26 containing machine-readable executable instructions for mapping structured pictographs 10' into determined groupings 28 of respective variations relative to a root pictograph 18, according to an example embodiment. Each pictograph 10 can be encoded using 8-bit Unicode Transformation Format (UTF-8) characters, preceded by character string "\u", enabling transfer via the WAN 24 of any selected pictograph 10 in a text-based message based on transmitting a corresponding hexadecimal string 14 that causes a receiving network device detecting the preceding character string "\u" to render the received hexadecimal string 14 for display as a graphical pictograph.

Figure 3:
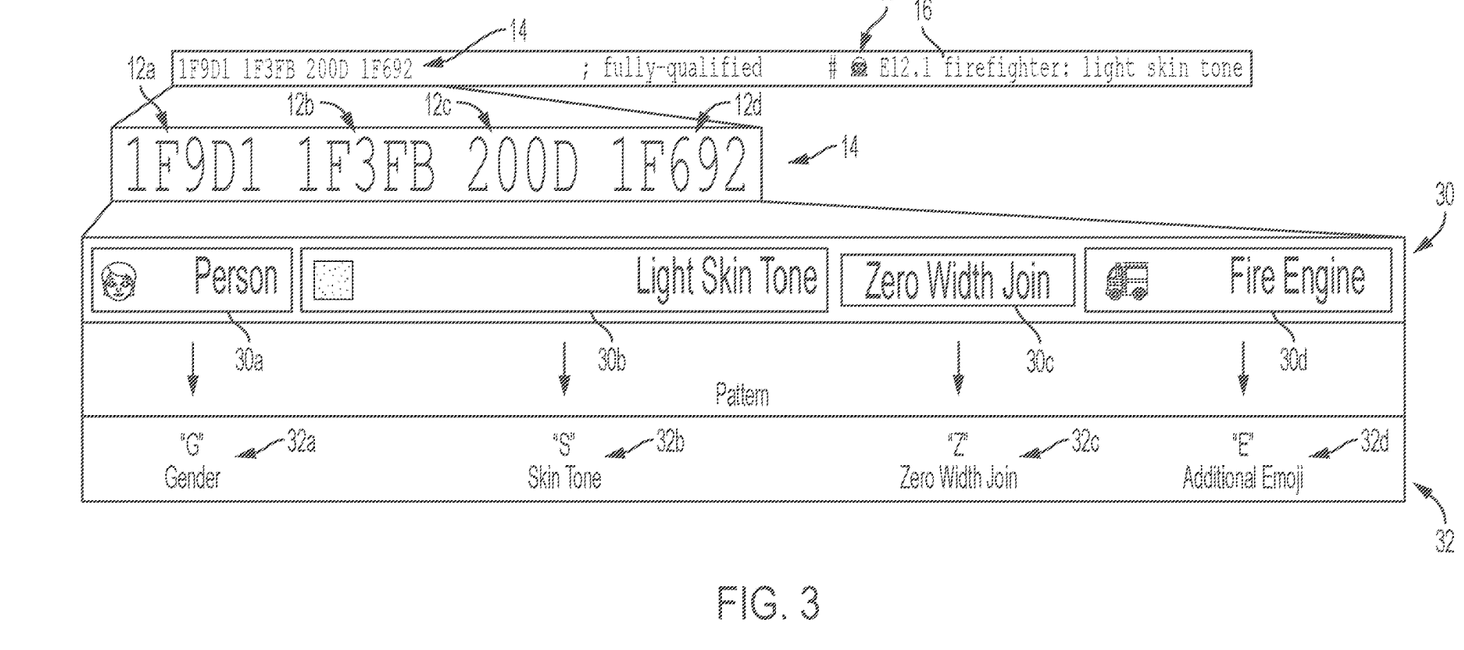
FIG. 3 illustrates an example mapping of identifiable graphical subcomponents, from the code points of pictographs, into distinct pattern marker types for generation of a selected pictograph, according to an example embodiment.

FIG. 3 illustrates an example mapping by the computing device 20 of identifiable graphical subcomponents 30, from the code points 12 of a pictograph 10, into distinct pattern marker types 32 for generation of a selected pictograph, according to an example embodiment. As described in further detail below, the computing device 20 can generate the executable container 26 based on executing an automated structured mapping of the code points 12 into a metadata-based vocabulary of pattern marker types 32, and based on autonomously identifying selected graphical subcomponents 30 as optional variations relative to a pattern marker type 32 (e.g., "person", "man" and "woman" identified as optional variations of the pattern marker type "gender" 32a).

The executable container 26 generated by the computing device 20 of FIG. 2 contains machine-readable instructions that can be executed by the computing device 20 for causing the display of the structured pictographs 10' as a grouping 28 of respective variations relative to a root pictograph 18. In one example, the computing device 20 can execute executable code (stored on one or more non-transitory tangible media accessible by the computing device 20) that causes a runtime compilation operation that executes the retrieval of respective code points 12 for respective pictographs 10 from the prescribed destination device 22, and the generation and mapping of identifiable graphical subcomponents 30 into pattern marker types 32. Hence, the executable container 26 generated by the computing device 20 can include executable instructions for implementing the metadata-based "vocabulary" structure of the pattern marker types 32 for display by the computing device 20; the executable container 26 also can be forwarded to a distinct user device (e.g., a smart tablet or smart phone operating under the commercially-available Android operating system or IOS) 34 for example as part of a "software update", causing the user device 34 to display the pictographs as a grouping 28 of respective variations in response to a user selecting a corresponding root pictograph 18.

Figure 4:
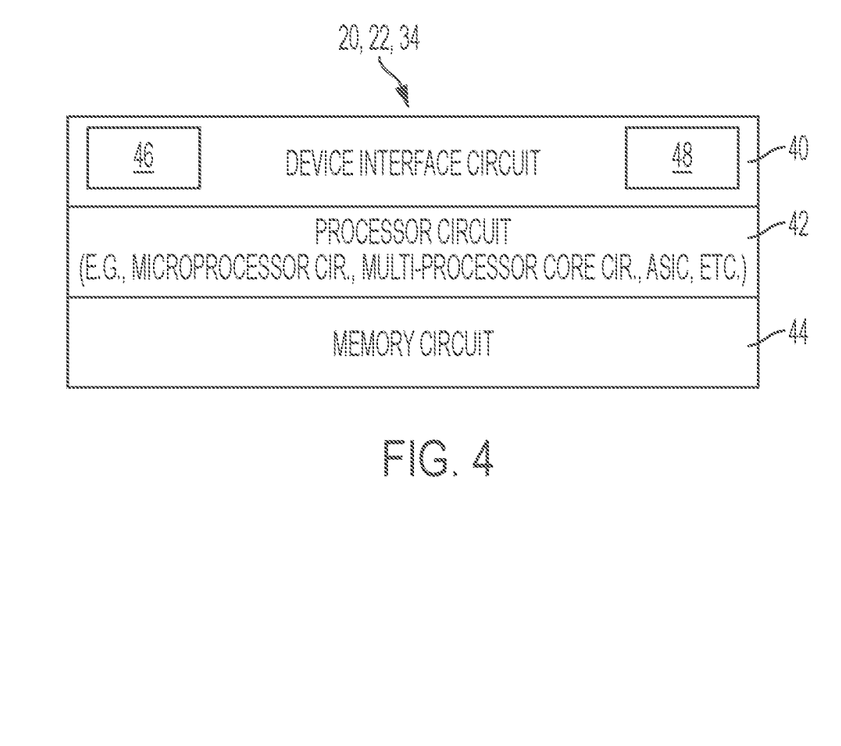
FIG. 4 illustrates an example implementation of any of the network devices described with reference to any of the Figures, according to an example embodiment.

FIG. 4 illustrates an example implementation of any one of the physical network devices (e.g., 20, 22, and/or 34) shown in any of the other Figures, according to an example embodiment.

Each apparatus (e.g., 20, 22, and/or 34 of FIG. 2) can include a device interface circuit 40, a processor circuit 42, and a memory circuit 44. The device interface circuit 40 can include one or more distinct physical layer transceivers for communication with any one of the other devices (e.g., 20, 22, and/or 34); the device interface circuit 40 also can include an IEEE based Ethernet transceiver for communications with the devices of FIG. 1 via any type of data link (e.g., a wired or wireless link, an optical link, etc.). The device interface circuit 40 also can include a sensor circuit 46 (comprising, for example a touchscreen sensor, a microphone, one or more cameras, and/or an accelerometer, etc.), and a display circuit (e.g., a touchscreen display for a smart tablet or smart phone, integrated display for a laptop device, display driver interface circuit for remote display device, etc.) 48 configured for causing a visually-perceptible display of data in the forms of alphanumeric characters, pictographs, shapes (e.g., borders), etc. The processor circuit 42 can be configured for executing any of the operations described herein, and the memory circuit 44 can be configured for storing any data or data packets as described herein.

Any of the disclosed circuits of the devices (e.g., 20, 22, and/or 34) (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/ packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Figure 5A:
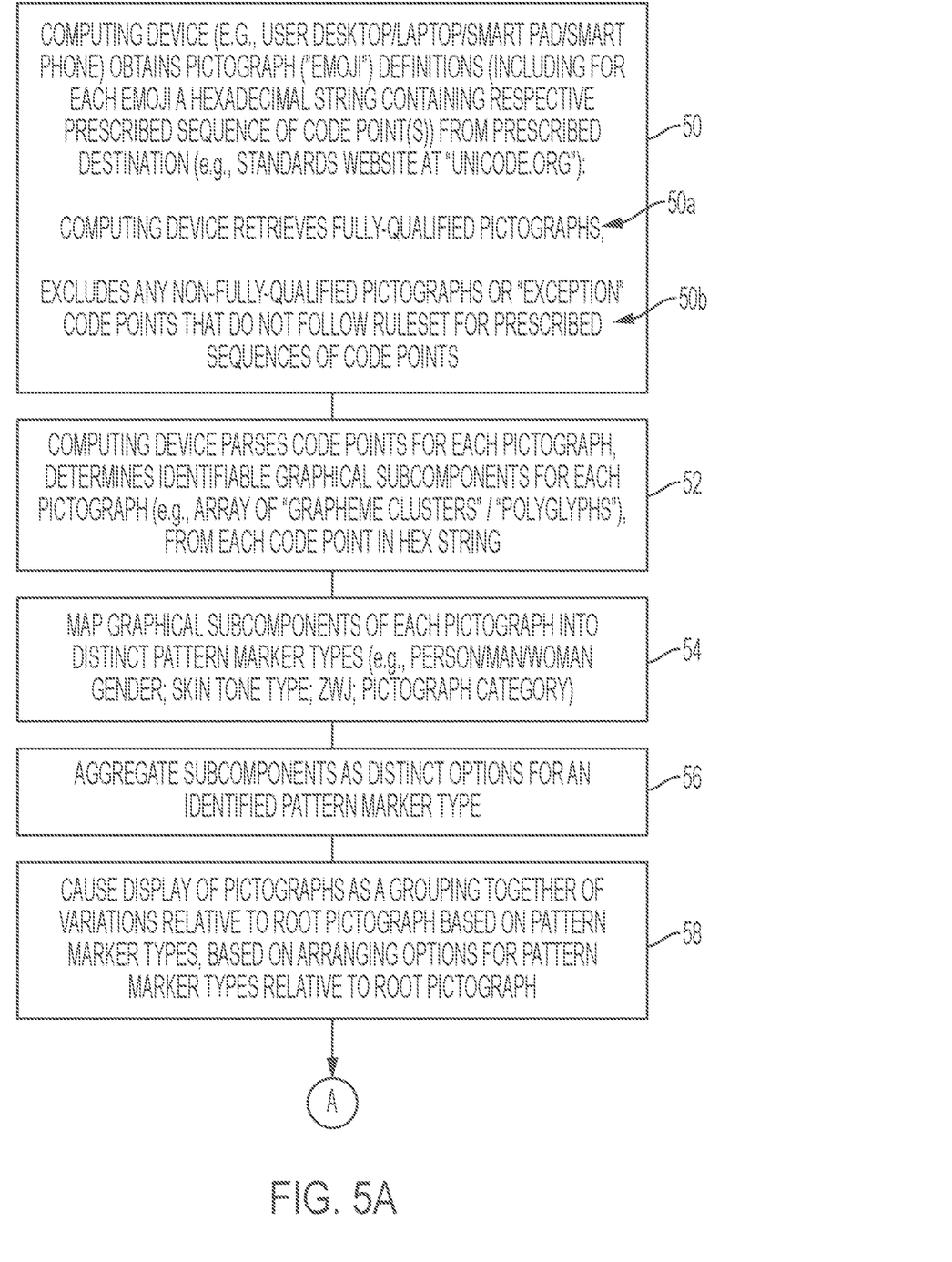
FIGS. 5A-5B illustrate a method by the apparatus of FIG. 2 in causing display of pictographs as a grouping together of respective variations relative to a root pictograph, enabling a user selection of a selected pictograph within the grouping relative to the root pictograph, according to an example embodiment.
Figure 5B:
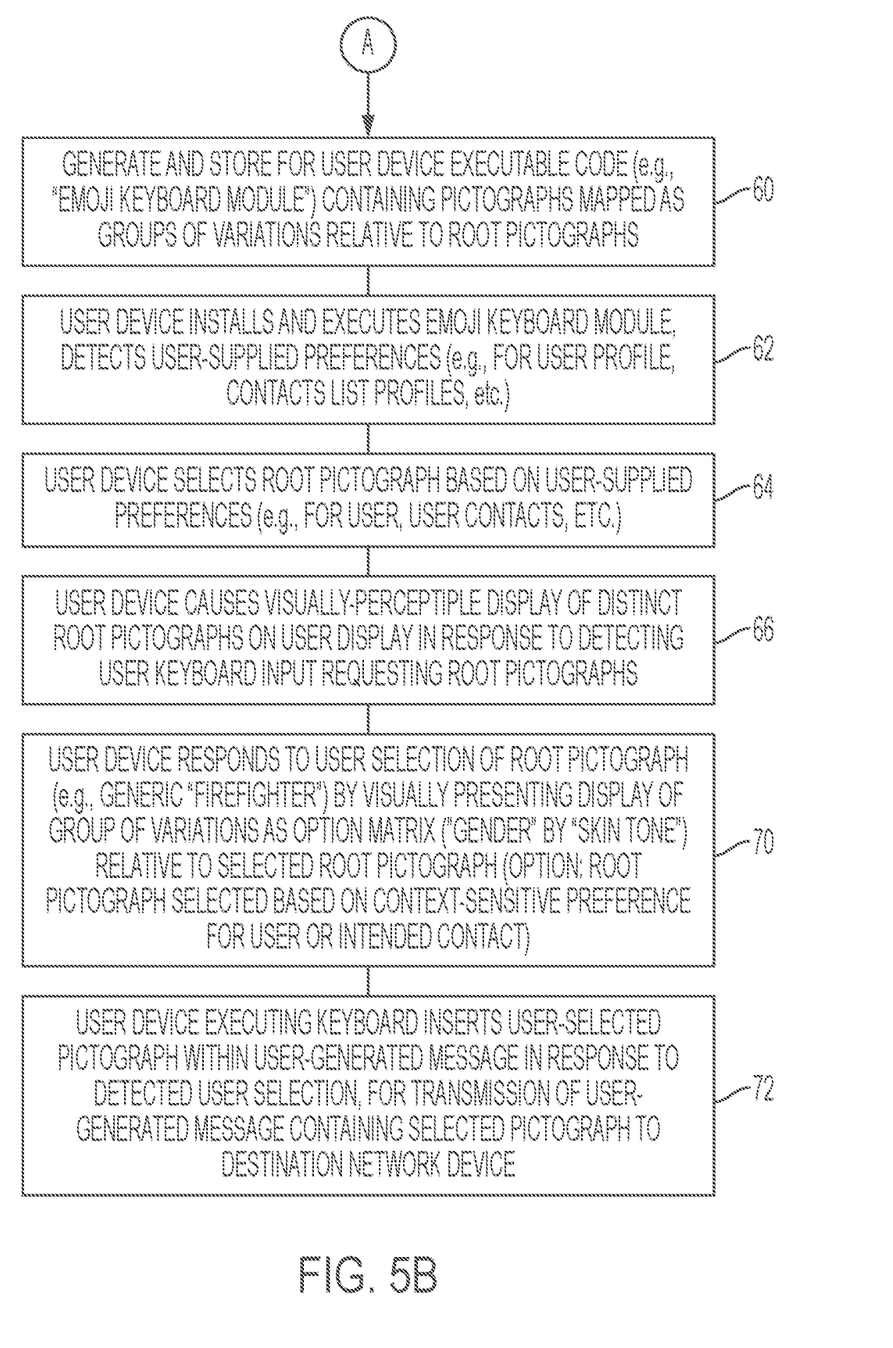

FIGS. 5A-5B illustrate a method by the apparatus of FIG. 2 in causing display of structured pictographs 10' as a grouping together 28 of respective variations relative to a root pictograph 18, enabling a user selection of a selected pictograph within the grouping relative to the root pictograph, according to an example embodiment.

Referring to FIG. 5A, the processor circuit 42 of the computing device 20, implemented for example as a user desktop device, a laptop device, a smart tablet or "pad", a 5G-enabled smart phone etc., in operation 50 can execute executable code stored in the memory circuit 44 and in response obtain, from a prescribed destination device 22 specified in the stored executable code, a plurality of code points 12 for respective pictographs 10. The executable code can be generated, for example, using the commercially-available "Gradle" scripting language.

Each code point 12 for a pictograph 10 can be obtained in operation 50 by the processor circuit 42 of the computing device 20, for example, based on retrieving the corresponding hexadecimal string 14 (comprising the corresponding prescribed sequence of code points 12), and optionally the corresponding pictograph definition 16.

The processor circuit 42 of the computing device 20 in operation 50 can retrieve the hexadecimal string 14 and corresponding pictograph definition 16 for a pictograph from a prescribed destination hosted by The Unicode Consortium, for example a web page at a prescribed web site address such as the previously-identified Internet Address "unicode.org/Public/emoji/13.0/emoji-test.txt") As apparent from the foregoing, the actual pictograph 10 illustrated in FIG. 1 need not be retrieved by the computing device 20, as a device-specific pictograph 10' can be generated by the computing device 20 (under the control of a programmer) for optimized display on the computing device 20 and/or a user device 34. In addition, the processor circuit 42 of the computing device 20 in operation 50 can retrieve the hexadecimal string 14 and corresponding pictograph definition 16 for each pictograph based on retrieving only "fully-qualified" pictographs in operation 50a, and excluding in operation 50b from the retrieving of operation 50a the corresponding hexadecimal string 14 or pictograph definition 16 of any pictograph that is not fully qualified; the processor circuit 42 of the computing device 20 in operation 50b also can exclude from the retrieving of operation 50a any "exception" code points that do not follow any definable ruleset for prescribed sequences of code points.

As described previously, a fundamental problem with defining the pictographs 10 using the existing prescribed sequence of code points 12 to modify definitions is that there currently exists no consistency and no coherence or hierarchy in defining the pictographs; to the contrary, existing definitions of pictographs 10 use discontinuous sets of the same pattern, or modified sets of different patterns, resulting in pictograph definitions that have no regard to any relationship between codepoint values and "base" or "root" pictographs.

Hence, the example embodiments generate the metadata-based "vocabulary" structure for the pictographs based on parsing the code points 12 from each hexadecimal string 14 in operation 52, and determining for each code point 12 a corresponding graphical subcomponent 30 (also referred to as a "glyph" or a "grapheme cluster") that describes the corresponding code point 12. In particular, the processor circuit 42 of the computing device 20 in operation 52 can parse the code points 12 from the hexadecimal string 14 of each obtained pictograph in order to detect each code point 12, for example using the commercially-available "Breakiterator" executable resource. As illustrated in FIG. 3, the processor circuit 42 of the computing device 20 in operation 52 can determine the boundaries of each code point 12a, 12b, 12c, and 12d from the hexadecimal string 14 retrieved from the prescribed destination device 22. The processor circuit 42 of the computing device 20 in operation 52 also can determine respective graphical subcomponents 30a, 30b, 30c, and 30d for the respective code point 12a, 12b, 12c, and 12d, for example based on iterating across the code points 12a, 12b, 12c, and 12d and associated definitions 16 across one or more hexadecimal strings 14 providing different definitions for the different combinations of the code points 12, described in further detail below with respect to FIG. 6. The processor circuit 42 of the computing device 20 also can apply executable text recognition resources to each pictograph definition 16 in order to interpret each pictograph definition 16 relative to the code points 12 parsed from the corresponding hexadecimal string 14.

As illustrated in FIG. 3, the processor circuit 42 of the computing device 20 in operation 52 can identify a "person" graphical subcomponent 30a from the code point "1F9D1" 12a, a "light skin tone" graphical subcomponent 30b from the code point "1F3FB" 12b, a "zero-width-join" (ZWJ) graphical subcomponent 30c from the code point "200D" 12c, and a "fire engine" graphical subcomponent 30d from the code point "1F692" 12d.

Hence, the processor circuit 42 of the computing device 20 in operation 40 can determine that the code point "1F9D1" 12a is a representational instance of the "person" graphical subcomponent 30a; the code point "1F3FB" 12b is a representational instance of the "light skin tone" graphical subcomponent 30b; the code point "200D" 12c is a representational instance of the ZWJ graphical subcomponent 30c; and the code point "1F692" 12d is a representational instance of the "fire engine" graphical subcomponent 30d. Hence, the processor circuit 42 of the computing device 20 in operation 52 can determine that the array of the graphical subcomponents 30a, 30b, 30c, and 30d results in generation of a "firefighter: light skin tone" according to the corresponding pictographic definition 16.

The processor circuit 42 of the computing device 20 in operation 54 can map the graphical subcomponents 30 of each pictograph 10 into distinct pattern marker types 32 that provide a structured metadata definition for the respective graphical subcomponents 30. Hence, as illustrated in FIG. 3 the processor circuit 42 of the computing device 20 in operation 54 can map the graphical subcomponent 30a as a glyph option within the gender pattern marker type "G" 32a, the graphical subcomponent 30b as a glyph option within the skin tone pattern marker type "S" 32b, the ZWJ graphical subcomponent 30c into the ZWJ pattern marker type 32c, and the graphical subcomponent 30d as a glyph option within the pictograph category (or "additional emoji", "subgroup", "family") pattern marker type "E" 32d.

Figure 6:
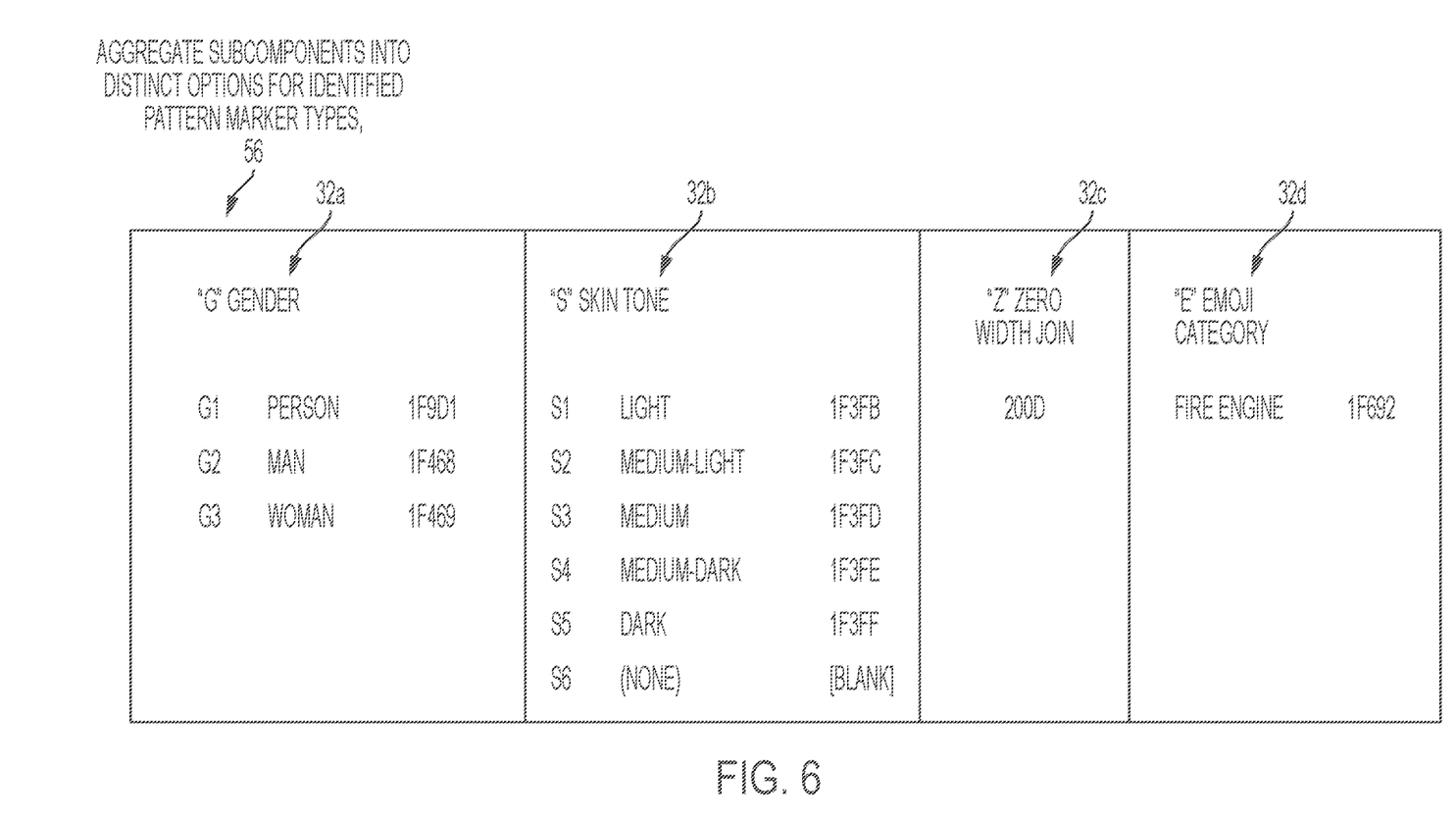
FIG. 6 illustrates aggregating selected graphical subcomponents from among the pictographs as distinct options for an identified one of the pattern marker types, according to an example embodiment.

The processor circuit 42 of the computing device 20 in operation 56 can "populate" the metadata-based "vocabulary" structure based on aggregating selected graphical subcomponents 30 from among the sequences of code points 12 from respective pictographs as distinct options for an identified one of the pattern marker types 32. As illustrated in FIG. 6, the processor circuit 42 of the computing device 20 in operation 56 can parse the various hexadecimal strings 14 of FIG. 1, parse the associated sequences of code points 12 for identifying the respective graphical subcomponents 30, and aggregate the subcomponents 30 as distinct options (e.g., "G1" through "G3"; "S1" through "S6") for an identified pattern marker type (e.g., the gender pattern marker type "G" 32a or the skin tone pattern marker type "S" 32b).

As illustrated in FIG. 6, the processor circuit 42 of the computing device 20 in operation 56 can identify, from the hexadecimal strings 14 illustrated in FIG. 1 and retrieved in operation 50, that the gender pattern marker type "G" 32a can include the gender options "G1—Person" (defined by the code point "1F9D1" 12), "G2—Man" (defined by the code point "1F468"), and "G3—Woman" (defined by the code point "1F469"); the processor circuit 42 of the computing device 20 in operation 56 also can identify the skin tone options "S1—Light" (defined by the code point "1F3FB") through "S5—Dark" (defined by the code point "1F3FF") and the "null" skin tone option "S6—(NONE)" that is defined by no code point.

Consequently, the identification of options, for example the option "Gi" for a gender pattern marker type "G" 32a, or the option "Si" for a skin tone pattern marker type "S" 32b, enables a structured identification of each of the structured pictographs 10' using a metadata vocabulary for each graphical subcomponent or "glyph", for example: "<pattern marker><optional pattern marker option><code point string>". Hence, the example option "G3" can be represented and stored in a data structure in the memory circuit 44 using the metadata data structure "<pattern marker G><optional pattern marker option G3><code point string 1F469>", or the more compressed version "<G3 1F269>" (assuming the designation "Gi" is used only to identify an option of the gender pattern marker type "G" 32a); similarly, the example option "S4" can be represented and stored using the metadata data structure "<pattern marker S><optional pattern marker option S4><code point string 1F3FE>", or the more compressed version "<S4 1F3FE>", Hence, the processor circuit 42 of the computing device 20 in operation 58 can cause display of structured pictographs 10' as a grouping 28 of respective variations relative to a root pictograph 18 that is based on an identified one of the pattern marker types 32, where each structured pictograph 10' can be generated based on combined rendering of one or more pattern marker types 32, and each of the structured pictographs 10' associated with a root pictograph 18 can be grouped together based on arranging the options (e.g., "Gi", "Si") for the gender pattern marker type "G" 32a and the skin tone pattern marker type "S" 32b relative to the root pictograph 18, illustrated in FIGS. 7A and 7B.

Figure 7A:
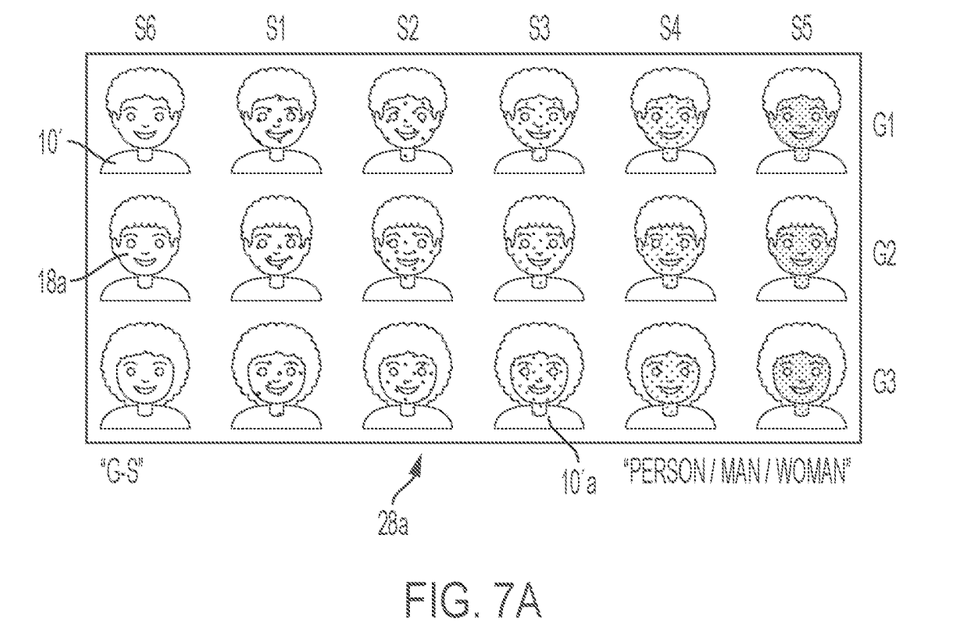
FIGS. 7A and 7B illustrate example first and second groupings of pictographs as variations relative to first and second root pictographs, respectively, according to an example embodiment.
Figure 7B:
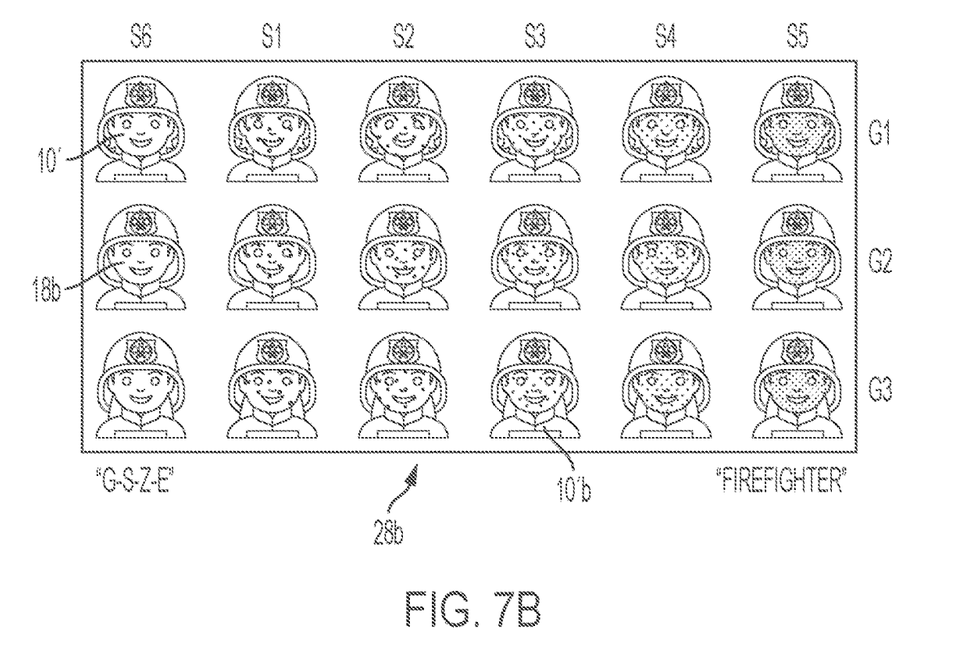

FIGS. 7A and 7B illustrate example first and second groupings 28a, 28b of structured pictographs generated in operation 58 as variations relative to first and second root pictographs 18a, 18b, respectively, according to an example embodiment. The processor circuit 42 of the computing device 20 in operation 58 can cause generation of the "person/man/woman" grouping 28a (also referred to as a "G-S" grouping 28a) based on rendering the permutations of options "G1", "G2", and "G3" in combination with the permutations of options "S6" and "S1" through "S5", resulting in the "person/man/woman" grouping 28a. As apparent from the foregoing, the "person/man/woman" grouping 28a can be generated despite the absence of any common generic code point. Hence, a pictograph "woman: medium skin tone" can be generated and rendered as a structured pictograph 10'a in the "person/man/woman" grouping 28a based on executing the combined rendering "G-S" on the metadata options "<G3 1F469><S3 1F3FD>".

Similarly, the processor circuit 42 of the computing device 20 in operation 58 can cause generation of the "firefighter" grouping 28b (also referred to as the "G-S-Z-E" grouping 28b) in FIG. 7B, based on rendering the permutations of options "G1", "G2", and "G3" in combination with the permutations of options "S6" and "S1" through "S5", in combination with the ZWJ pattern marker type "Z" 32c and the pictograph category pattern marker type "E" 32d, resulting in the "firefighter" grouping 28b. In other words, the processor circuit 42 of the computing device 20 in operation 58 can cause generation of the "firefighter" grouping 28b based on adding, to the combined rendering "G-S" of FIG. 7A, the additional metadata modifiers "<Z 200D>" and "<E 1F692> from the ZWJ pattern marker type "Z" 32c and the pictograph category pattern marker type "E" 32d, respectively. "Hence, the pictograph "woman firefighter: medium skin tone" can be generated and rendered as a structured pictograph 10'b in the "firefighter" grouping 28b based on executing the combined rendering "G-S-Z-E" on the metadata options "<G3 1F469><S3 1F3FD><Z 200D><E 1F692>".

Hence the processor circuit 42 of the computing device 20 in operation 60 of FIG. 5B can generate and store in the memory circuit 44 an executable container (26 of FIG. 2) that contains executable code for causing the display by the computing device 20 of the structured pictographs 10' as groupings 28 relative to a root pictograph 18, described in further detail below with respect to FIG. 8. If desired, a programmer can utilize the execution of the executable container 26 by the processor circuit 42 of the computing device 20 for generating device-optimized glyphs for each of the options of the pattern marker types 32, as appropriate, else a programmer can retrieve pre-existing glyphs for each of the options of the pattern marker types 32 from an available source.

The processor circuit 42 of the computing device 20 in operation 60 also can cause the executable container 26 to be distributed and loaded on a user device 34 (e.g., via a wired or wireless data link), for example as part of a "software update" by the user device 34. Hence, a user of the user device 34 in operation 62 can install and execute the executable container 26, for example as part of an emoji keyboard module that is executed by the processor circuit 42 of the user device 34. An example executable container 26 that can generate the structured pictographs 10' as a selected grouping as described herein is the commercially-available "KeyP" secure keyboard from WhiteStar Communications, Inc., Durham, North Carolina, at the website address "www.whitestar.io/". Additional details regarding the "KeyP" secure keyboard are described in commonly-assigned, copending application Ser. No. 17/496,164, filed Oct. 7, 2021, entitled "SECURE KEYBOARD RESOURCE LIMITING ACCESS OF USER INPUT TO DESTINATION RESOURCE REQUESTING THE USER INPUT", the disclosure of which is incorporated in its entirety herein by reference.

A user of the user device 34 (and/or the computing device 20) executing the executable container 26 can select (e.g., during installation of the executable container 26) one or more root pictographs 18 based on user-supplied preferences: in one example, a user can input a user-preference for "Gender=Male" and "Skin Tone=(None)", causing the processor circuit 42 of the computing device 20 (and/or user device 34) to set a user metadata preference of "<User G2 S6>". The processor circuit 42 of the computing device 20 (and/or the user device 34) also can generate respective contact metadata preferences (e.g., "<Contact_x, Gy Sz>" for various "friends" or "contacts" (retrieved, for example, from a contact list stored in the memory circuit 44 of the user device 34 and/or the computing device 20).

Hence, the processor circuit 42 of the user device 34 (and/or the computing device 20) in operation 64 can select one or more root pictographs 18 for the user (and/or a destination contact) based on the associated user metadata preference and/or contact metadata preference.

A user of the user device 34 (and/or the computing device 20) in operation 66 can cause the processor circuit 42 to execute a visually-perceptible display (68 of FIG. 8) of distinct root pictographs 18, for example in response to the processor circuit 42 detecting (via the sensor circuit 46) a user keyboard input requesting the visually-perceptible display 68 for insertion of a structured pictograph 10' into a text-based message.

Figure 8:
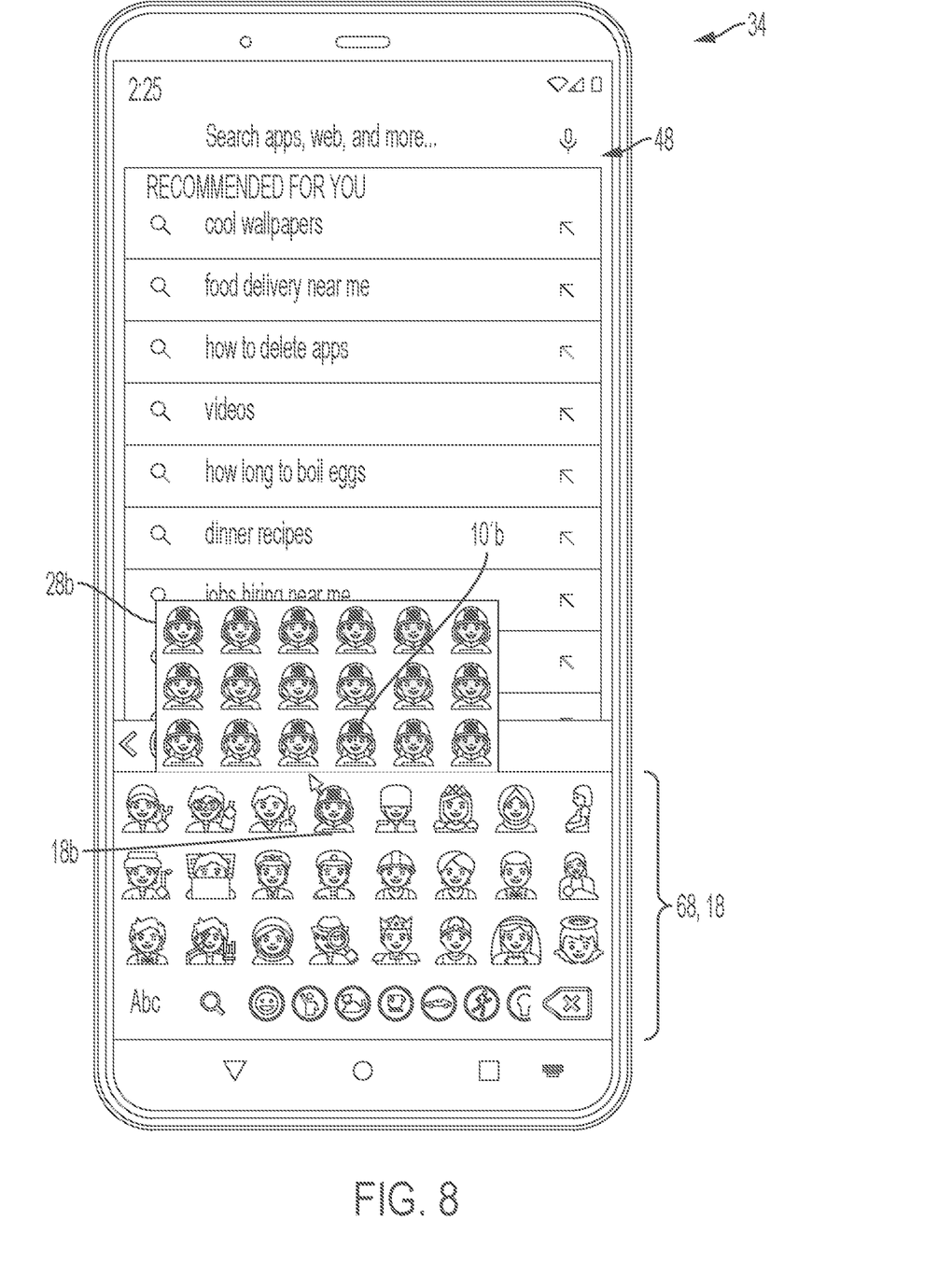
FIG. 8 illustrates a user device causing a visually-perceptible display of the second grouping of pictographs of FIG. 7B, in response to user selection of the corresponding second root pictograph, according to an example embodiment.

FIG. 8 illustrates a user device (e.g., an Android-based smart phone) 34 causing a visually-perceptible display 68 of a plurality of root pictographs 18 on a user display, according to an example embodiment. As illustrated in FIG. 8, the user selection of a prescribed keyboard input can cause the processor circuit 42 of the user device 34 in operation 66 to cause the display of the visually-perceptible display 68 of the root pictographs 18 generated as described above, for example based on the combined renderings of or more of the pattern marker types 32.

In response to the user of the user device 34 (and/or the computing device 20) selecting the root pictograph "firefighter" 18b (indicated in FIG. 8 by the "cursor arrow" overlying the root pictograph 18b), the processor circuit 42 of the user device 34 executing the executable container 26 in operation 70 can respond to the user selection by visually presenting the "firefighter" grouping 28b of FIG. 7B as an option matrix comprising the "G1", "G2", and "G3" options of the gender pattern marker type "G" 32a in respective rows and the "S6" and "S1" through "S5" options of the skin tone pattern marker type "S" 32b in respective columns, relative to the selected root pictograph 18b. As described previously, the root pictograph 18b can be selected based on a context-sensitive user metadata preference of "<User G2 S6>, or a contact metadata preference (e.g., "<Contact_x, Gy Sz>").

Hence, a user presented with the "firefighter" grouping 28b in operation 70 as a group of variations in the structured pictographs 10' relative to the selected root pictograph 18b can select a user-selected pictograph 10'b for insertion into a user-generated message, causing the processor circuit 42 of the user device 34 (and/or the computing device 20) in operation 72 to insert the selected structured pictograph 10'b within a user-generated message based on assembling the associated code point values specified in the associated metadata values "G3-53-Z-E" for the respective pattern markers 32a and 32b, with the remaining pattern markers 32c, and 32d, enabling the dynamic construction of the code point sequence "1F469 1F3FD 200D 1F692" for transmission of a user-generated message containing the selected pictograph to a destination network device. Additional details regarding secure transmission of the user-generated message are described in the above-incorporated application Ser. No. 17/496,164.

According to example embodiments, prescribed sequences of code points for respective pictographs can be mapped as distinct options of pattern marker types, causing the display of multiple pictographs as a grouping together of respective variations relative to a root pictograph based on an identified one of the pattern marker types. The example embodiments enable establishment of a metadata-based "vocabulary" structure for the pictographs, in a manner that can dramatically improve the efficiency of generating device-specific executable code for generation and display of the pictographs, and that can substantially improve the user experience in viewing, locating, and selecting a specific pictograph based on the organized presentation of the pictographs in a hierarchal presentation comprising a first-order display of root pictographs overlying a second-order display of selected pictographs that are grouped together as variations of a selected root pictograph.

The example embodiments also can be readily and efficiently deployed for use by device programmers and device users. A working model of the example embodiments has been implemented, for example in the above-identified commercially-available "KeyP" secure keyboard from WhiteStar Communications, Inc.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   obtaining, by a physical computing device from a prescribed destination via a wide area data network, prescribed sequences of code points for respective pictographs, each pictograph defined by a hexadecimal string comprising a corresponding prescribed sequence of associated hexadecimal code points;
   determining, by the physical computing device, identifiable graphical subcomponents from the prescribed sequence of code points for each pictograph based on parsing from the corresponding hexadecimal string each of the associated hexadecimal code points in the corresponding prescribed sequence, and determining for each of the associated hexadecimal code points the corresponding graphical subcomponent;

mapping, by the physical computing device, the identifiable graphical subcomponents into distinct pattern marker types that provide a structured definition for the identifiable graphical subcomponents, the pattern marker types used for generation of a selected pictograph, the mapping including aggregating selected graphical subcomponents from among the pictographs as distinct options for an identified one of the pattern marker types; and causing, by the physical computing device, display of the pictographs as a grouping together of respective variations relative to a root pictograph that is based on the identified one of the pattern marker types according to the structured definition, the grouping based on arranging the distinct options for the pattern marker types relative to the root pictograph, enabling a user selection of the selected pictograph within the grouping relative to the root pictograph.

2. The method of claim 1, wherein the obtaining includes retrieving fully-qualified pictographs for the determining, and excluding from the retrieving any pictograph that is not fully qualified.

3. The method of claim 2, wherein the obtaining further includes excluding from the retrieving any pictograph defined by a character string that does not identify any prescribed sequence of code points.

4. The method of claim 1, wherein the causing includes generating and storing, on a non-transitory machine-readable storage medium, an executable container that, when executed by a user device, causes the user device to present the variations upon selection of the root pictograph.

5. The method of claim 1, wherein the causing further includes causing selection of one of the variations as the root pictograph based a determined match with user-supplied preferences.

6. The method of claim 1, wherein the pattern marker types include a gender pattern marker type, a skin tone pattern marker type, a zero-width join pattern marker type, and a pictograph category pattern marker type.

7. The method of claim 1, further comprising:
causing, by the physical computing device, a visually-perceptible display of a plurality of distinct root pictographs, comprising the root pictograph, on a user display in response to detecting a user keyboard input requesting the distinct root pictographs;
the causing display of the pictographs grouped together in response to the user selection of the root pictograph among the distinct root pictographs.

8. The method of claim 7, further comprising:
inserting, by the physical computing device, the selected pictograph within a user-generated message in response to detecting the user selection of the selected pictograph, for transmission of the user-generated message containing the selected pictograph to a destination network device based on a corresponding selection of a destination user.

9. The method of claim 1, wherein the structured definition of the pattern marker types establishes a metadata vocabulary for each identifiable graphical subcomponent.

10. The method of claim 1, wherein the causing includes causing the display of the pictographs based on a combined rendering of one or more of the pattern marker types with rendering of a permutation of the distinct options.

11. One or more non-transitory tangible media are encoded with logic for execution by a machine and when executed by the machine operable for:

obtaining, by the machine implemented as a physical computing device from a prescribed destination via a wide area data network, prescribed sequences of code points for respective pictographs, each pictograph defined by a hexadecimal string comprising a corresponding prescribed sequence of associated hexadecimal code points;

determining identifiable graphical subcomponents from the prescribed sequence of code points for each pictograph based on parsing from the corresponding hexadecimal string each of the associated hexadecimal code points in the corresponding prescribed sequence, and determining for each of the associated hexadecimal code points the corresponding graphical subcomponent;

mapping the identifiable graphical subcomponents into distinct pattern marker types that provide a structured definition for the identifiable graphical subcomponents, the pattern marker types used for generation of a selected pictograph, the mapping including aggregating selected graphical subcomponents from among the pictographs as distinct options for an identified one of the pattern marker types; and causing display of the pictographs as a grouping together of respective variations relative to a root pictograph that is based on the identified one of the pattern marker types according to the structured definition, the grouping based on arranging the distinct options for the pattern marker types relative to the root pictograph, enabling a user selection of the selected pictograph within the grouping relative to the root pictograph.

12. The one or more non-transitory tangible media of claim 11, wherein the obtaining includes retrieving fully-qualified pictographs for the determining, and excluding from the retrieving any pictograph that is not fully qualified.

13. The one or more non-transitory tangible media of claim 12, wherein the obtaining further includes excluding from the retrieving any pictograph defined by a character string that does not identify any prescribed sequence of code points.

14. The one or more non-transitory tangible media of claim 11, wherein the causing includes generating and storing, on a non-transitory machine-readable storage medium, an executable container that, when executed by a user device, causes the user device to present the variations upon selection of the root pictograph.

15. The one or more non-transitory tangible media of claim 11, wherein the causing further includes causing selection of one of the variations as the root pictograph based a determined match with user-supplied preferences.

16. The one or more non-transitory tangible media of claim 11, wherein the pattern marker types include a gender pattern marker type, a skin tone pattern marker type, a zero-width join pattern marker type, and a pictograph category pattern marker type.

17. The one or more non-transitory tangible media of claim 11, further operable for:
causing a visually-perceptible display of a plurality of distinct root pictographs, comprising the root pictograph, on a user display in response to detecting a user keyboard input requesting the distinct root pictographs;
the causing display of the pictographs grouped together in response to the user selection of the root pictograph among the distinct root pictographs.

18. The one or more non-transitory tangible media of claim 17, further operable for:

inserting, by the physical computing device, the selected pictograph within a user-generated message in response to detecting the user selection of the selected pictograph, for transmission of the user-generated message containing the selected pictograph to a destination network device based on a corresponding selection of a destination user.

19. The one or more non-transitory tangible media of claim 11, wherein the structured definition of the pattern marker types establishes a metadata vocabulary for each identifiable graphical subcomponent.

20. An apparatus implemented as a physical machine, the apparatus comprising:

non-transitory machine readable media configured for storing executable machine readable code;

a device interface circuit configured for accessing a prescribed destination via a wide area network; and a processor circuit configured for executing the machine readable code as a secure executable container, and when executing the machine readable code operable for:

obtaining, from the prescribed destination, prescribed sequences of code points for respective pictographs, each pictograph defined by a hexadecimal string comprising a corresponding prescribed sequence of associated hexadecimal code points, determining identifiable graphical subcomponents from the prescribed sequence of code points for each pictograph based on parsing from the corresponding hexadecimal string each of the associated hexadecimal code points in the corresponding prescribed sequence, and determining for each of the associated hexadecimal code points the corresponding graphical subcomponent, mapping the identifiable graphical subcomponents into distinct pattern marker types that provide a structured definition for the identifiable graphical subcomponents, the pattern marker types used for generation of a selected pictograph, the mapping including aggregating selected graphical subcomponents from among the pictographs as distinct options for an identified one of the pattern marker types, and causing display of the pictographs as a grouping together of respective variations relative to a root pictograph that is based on the identified one of the pattern marker types according to the structured definition, the grouping based on arranging the distinct options for the pattern marker types relative to the root pictograph, enabling a user selection of the selected pictograph within the grouping relative to the root pictograph.

21. The apparatus of claim 20, wherein the causing includes generating and storing, on a non-transitory machine-readable storage medium, an executable container that, when executed by a user device, causes the user device to present the variations upon selection of the root pictograph.

* * * * *